United States Patent
Fersch et al.

(10) Patent No.: US 10,650,833 B2
(45) Date of Patent: *May 12, 2020

(54) METHODS, APPARATUS AND SYSTEM FOR RENDERING AN AUDIO PROGRAM

(71) Applicant: DOLBY INTERNATIONAL AB, Amsterdam Zuidoost (NL)

(72) Inventors: Christof Fersch, Neumarkt (DE); Alexander Stahlmann, Nuremberg (DE)

(73) Assignee: Dolby International AB, Amsterdam Zuidoost (NL)

(*) Notice: Subject to any disclaimer, the term of this patent is extended or adjusted under 35 U.S.C. 154(b) by 0 days.

This patent is subject to a terminal disclaimer.

(21) Appl. No.: 16/149,557

(22) Filed: Oct. 2, 2018

(65) Prior Publication Data

US 2019/0035411 A1 Jan. 31, 2019

Related U.S. Application Data

(62) Division of application No. 15/516,509, filed as application No. PCT/EP2015/072667 on Oct. 1, 2015, now Pat. No. 10,089,991.

(Continued)

(30) Foreign Application Priority Data

Oct. 3, 2014 (EP) .................................. 14187631

(51) Int. Cl.
*G10L 19/00* (2013.01)
*G10L 19/008* (2013.01)
(Continued)

(52) U.S. Cl.
CPC .......... *G10L 19/008* (2013.01); *G10L 19/018* (2013.01); *G10L 19/167* (2013.01);
(Continued)

(58) Field of Classification Search
CPC ...... G10L 19/167; G10L 19/008; G10L 19/20; G10L 19/018; G10L 19/032;
(Continued)

(56) References Cited

U.S. PATENT DOCUMENTS 6,112,170 A * 8/2000 Patwardhan .......... G10L 19/083
                                                     345/418
6,813,281 B1 * 11/2004 Moon ................... H04N 9/8063
                                                     348/462

(Continued)

FOREIGN PATENT DOCUMENTS

| CN | 101542597 | 9/2009 |
| CN | 103443854 | 12/2013 |

(Continued)

OTHER PUBLICATIONS

"A Guide to Dolby Metadata" Jan. 1, 2005, pp. 1-28 (available at http://www.dolby.com/us/en/technologies/a-juide-to-dolby-metadata.pdf).

(Continued)

*Primary Examiner* — Vijay B Chawan

(57) ABSTRACT

A method for generating a bitstream indicative of an object based audio program is described. The bitstream comprises a sequence of containers. A first container of the sequence of containers comprises a plurality of substream entities for a plurality of substreams of the object based audio program and a presentation section. The method comprises determining a set of object channels. The method further comprises providing a set of object related metadata for the set of object channels. In addition, the method comprises inserting a first set of object channel frames and a first set of object related metadata frames into a respective set of substream (Continued)

entities of the first container. Furthermore, the method comprises inserting presentation data into the presentation section.

4 Claims, 6 Drawing Sheets

Related U.S. Application Data

(60) Provisional application No. 62/146,468, filed on Apr. 13, 2015.

(51) Int. Cl.
| | | |
|---|---|---|
| *H04S 7/00* | (2006.01) | |
| *G11B 27/034* | (2006.01) | |
| *G11B 27/10* | (2006.01) | |
| *G10L 19/018* | (2013.01) | |
| *G10L 19/16* | (2013.01) | |
| *G11B 27/32* | (2006.01) | |
| *G11B 27/34* | (2006.01) | |

(52) U.S. Cl.
CPC .......... *G11B 27/034* (2013.01); *G11B 27/102* (2013.01); *G11B 27/105* (2013.01); *G11B 27/327* (2013.01); *G11B 27/34* (2013.01); *H04S 7/30* (2013.01); *H04S 7/308* (2013.01); *H04S 2400/01* (2013.01); *H04S 2400/03* (2013.01); *H04S 2400/11* (2013.01); *H04S 2400/15* (2013.01)

(58) Field of Classification Search
CPC ... G10L 19/083; G10L 19/24; H04S 2400/01; H04S 2420/03; H04S 2400/03; H04S 2420/01; H04S 2420/11; H04S 2420/13; G06F 3/165; H04R 5/02; G11B 2020/00014; G11B 2020/10601
USPC ..... 704/500–504, 200.1, 212, 224, 220, 225
See application file for complete search history.

(56) References Cited

U.S. PATENT DOCUMENTS

| | | | | |
|---|---|---|---|---|
| 7,231,268 | B1 * | 6/2007 | Moon | G11B 20/10 |
| | | | | 386/241 |
| 7,692,562 | B1 | 4/2010 | Wu | |
| 9,378,743 | B2 * | 6/2016 | Riedmiller | G10L 19/002 |
| 9,467,791 | B2 * | 10/2016 | Robinson | H04S 3/008 |
| 9,779,738 | B2 * | 10/2017 | Mundt | G10L 19/008 |
| 9,800,991 | B2 * | 10/2017 | Robinson | H04S 3/008 |
| 9,881,622 | B2 * | 1/2018 | Mehta | G06F 3/165 |
| 9,997,164 | B2 * | 6/2018 | France | H04S 3/008 |
| 10,089,991 | B2 * | 10/2018 | Fersch | G11B 27/34 |
| 2002/0019864 | A1 | 2/2002 | Mayer | |
| 2004/0208480 | A1 | 10/2004 | Yoon | |
| 2005/0007262 | A1 * | 1/2005 | Craven | G11B 20/00992 |
| | | | | 341/50 |
| 2007/0208571 | A1 | 9/2007 | Lemieux | |
| 2008/0209485 | A1 | 8/2008 | Emura | |
| 2009/0222118 | A1 | 9/2009 | Oh | |
| 2009/0254352 | A1 | 10/2009 | Zhao | |
| 2009/0265176 | A1 | 10/2009 | Oh | |
| 2010/0014692 | A1 * | 1/2010 | Schreiner | H04S 3/008 |
| | | | | 381/119 |
| 2010/0083344 | A1 | 4/2010 | Schildbach | |
| 2010/0188273 | A1 | 7/2010 | He | |
| 2011/0035227 | A1 | 2/2011 | Lee | |
| 2011/0202357 | A1 | 8/2011 | Kim | |
| 2012/0308049 | A1 * | 12/2012 | Schreiner | H04S 3/008 |
| | | | | 381/119 |
| 2014/0358554 | A1 * | 12/2014 | Riedmiller | G10L 19/002 |
| | | | | 704/500 |
| 2015/0348558 | A1 | 12/2015 | Riedmiller | |
| 2015/0358558 | A1 * | 12/2015 | McKenzie | H01L 27/14649 |
| | | | | 438/7 |
| 2016/0029140 | A1 * | 1/2016 | Mehta | G10L 19/008 |
| | | | | 381/307 |
| 2016/0064003 | A1 * | 3/2016 | Mehta | G06F 3/165 |
| | | | | 381/23 |
| 2018/0151186 | A1 * | 5/2018 | Mehta | H04S 3/008 |
| 2018/0268829 | A1 * | 9/2018 | France | H04S 7/30 |
| 2019/0035411 | A1 * | 1/2019 | Fersch | G11B 27/105 |

FOREIGN PATENT DOCUMENTS

| | | |
|---|---|---|
| CN | 103621101 | 3/2014 |
| EP | 2146522 | 1/2010 |
| JP | 3186472 | 10/2013 |
| WO | 2013/006338 | 1/2013 |
| WO | 2014/025752 | 2/2014 |
| WO | 2014/165668 | 10/2014 |

OTHER PUBLICATIONS

ETSI "Digital Audio Compression (AC-4) Standard Output Draft of TS 103 190 Second Resolution Meeting held on Mar. 17, 2014, draft ETSI TS 103 190".
Jeong, So-Young, et al "Fast Multimedia Contents Retrieval by Partially Spoken Query" IEEE International Conference on Consumer Electronics, pp. 839-840, Jan. 9-12, 2011.
Shin, Hyoseop "A Storage and Retrieval Method of XML-Based Metadata in PVR Environment" IEEE Transactions on Consumer Electronics, vol. 49, No. 4, Nov. 2003, pp. 1136-1140.
Zhao, L. et al "An Optimized Method and Implementation for Parsing MP4 Metadata" IEEE International Conference on Progress in Informatics and Computing, vol. 2, pp. 984-987, Dec. 2010.

* cited by examiner

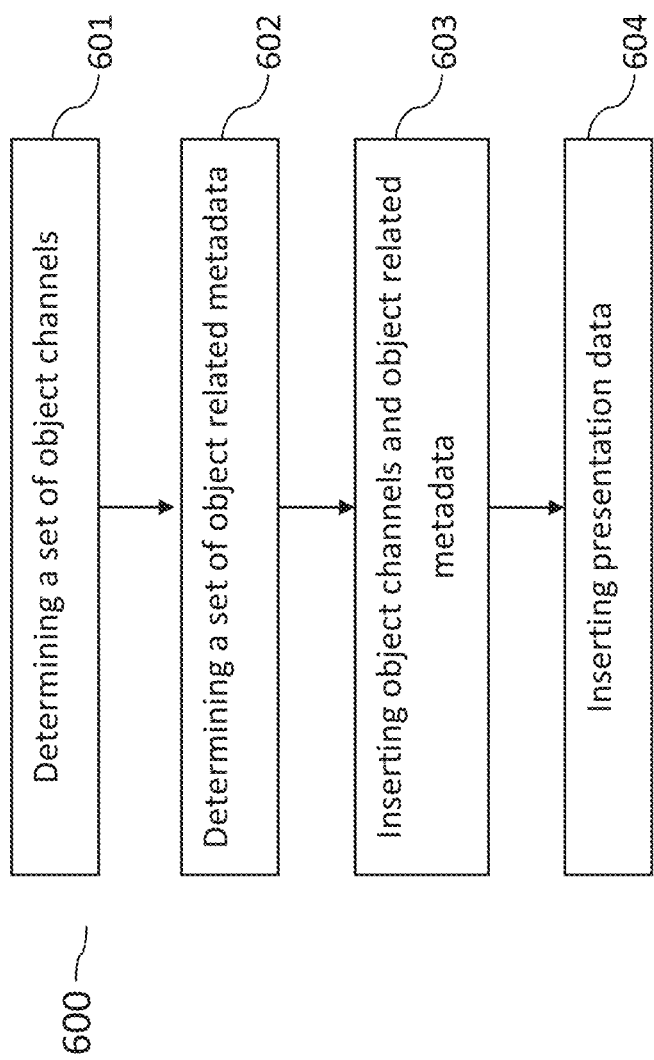

METHODS, APPARATUS AND SYSTEM FOR RENDERING AN AUDIO PROGRAM

CROSS-REFERENCE TO RELATED APPLICATIONS

This application is a divisional and claims the benefit of priority U.S. patent application Ser. No. 15/516,509 filed Apr. 3, 2017, which claims priority to International Patent Application No. PCT/EP2015/072667 filed Oct. 1, 2015, which claims priority to U.S. Provisional Patent Application No. 62/146,468 filed on Apr. 13, 2015 and European Patent Application No. 14187631.8 filed on Oct. 3, 2014, all of which are hereby incorporated by reference in their entirety.

TECHNICAL FIELD

The present document relates to audio signal processing, and more particularly, to encoding, decoding, and interactive rendering of audio data bitstreams which include audio content, and metadata which supports interactive rendering of the audio content.

BACKGROUND

Audio encoding and decoding systems enabling personalized audio experiences typically need to carry all audio object channels and/or audio speaker channels that are potentially needed for a personalized audio experience. In particular, the audio data/metadata is typically such that parts which are not required for a personalized audio program cannot be easily removed from a bitstream containing such personalized audio program.

Typically, the entire data (audio data and metadata) for an audio program is stored jointly within a bitstream. A receiver/decoder needs to parse at least the complete metadata to understand which parts (e.g. which speaker channels and/or which object channels) of the bitstream are required for a personalized audio program. In addition, stripping off of parts of the bitstream which are not required for the personalized audio program is typically not possible without significant computational effort. In particular, it may be required that parts of a bitstream which are not required for a given playback scenario/for a given personalized audio program need to be decoded. It may then be required to mute these parts of the bitstream during playback in order to generate the personalized audio program. Furthermore, it may not be possible to efficiently generate a sub-bitstream from a bitstream, wherein the sub-bitstream only comprises the data required for the personalized audio program.

The present document addresses the technical problem of providing a bitstream for an audio program, which enables a decoder of the bitstream to derive a personalized audio program from the bitstream in a resource efficient manner.

SUMMARY

According to an aspect a method for generating a bitstream which is indicative of an object based audio program is described. The bitstream comprises a sequence of containers for a corresponding sequence of audio program frames of the object based audio program. A first container of the sequence of containers comprises a plurality of substream entities for a plurality of substreams of the object based audio program. Furthermore, the first container comprises a presentation section. The method comprises determining a set of object channels indicative of audio content of at least some of a set of audio signals, wherein the set of object channels comprises a sequence of sets of object channel frames. The method also comprises providing or determining a set of object related metadata for the set of object channels, wherein the set of object related metadata comprises a sequence of sets of object related metadata frames. A first audio program frame of the object based audio program comprises a first set of object channel frames of the set of object channel frames and a corresponding first set of object related metadata frames. Furthermore, the method comprises inserting the first set of object channel frames and the first set of object related metadata frames into a respective set of object channel substream entities of the plurality of substream entities of the first container. In addition, the method comprises inserting presentation data into the presentation section, wherein the presentation data is indicative of at least one presentation. The presentation comprises a set of substream entities from the plurality of substream entities which are to be presented simultaneously.

According to another aspect, a bitstream indicative of an object based audio program is described. The bitstream comprises a sequence of containers for a corresponding sequence of audio program frames of the object based audio program. A first container of the sequence of containers comprises a first audio program frame of the object based audio program. The first audio program frame comprises a first set of object channel frames of a set of object channel frames and a corresponding first set of object related metadata frames. The set of object channel frames is indicative of audio content of at least some of a set of audio signals. The first container comprises a plurality of substream entities for a plurality of substreams of the object based audio program. The plurality of substream entities comprises a set of object channel substream entities for the first set of object channel frames, respectively. The first container further comprises a presentation section with presentation data, wherein the presentation data is indicative of at least one presentation of the object based audio program. The presentation comprises a set of substream entities from the plurality of substream entities which are to be presented simultaneously.

According to another aspect, a method for generating a personalized audio program from a bitstream as outlined in the present document is described. The method comprises extracting presentation data from the presentation section, wherein the presentation data is indicative of a presentation for the personalized audio program, and wherein the presentation comprises a set of substream entities from the plurality of substream entities which are to be presented simultaneously. Furthermore, the method comprises extracting, based on the presentation data, one or more object channel frames and corresponding one or more object related metadata frames from the set of object channel substream entities of the first container.

According to a further aspect, a system (e.g. an encoder) for generating a bitstream indicative of an object based audio program is described. The bitstream comprises a sequence of containers for a corresponding sequence of audio program frames of the object based audio program. A first container of the sequence of containers comprises a plurality of substream entities for a plurality of substreams of the object based audio program. The first container further comprises a presentation section. The system is configured to determine a set of object channels indicative of audio content of at least some of a set of audio signals, wherein the set of object channels comprises a sequence of sets of object channel frames. Furthermore, the system is configured to determine a set of object related metadata for the set of object channels, wherein the set of object related metadata comprises a sequence of sets of object related metadata frames. A first audio program frame of the object based audio program comprises a first set of object channel frames of the set of object channel frames and a corresponding first set of object related metadata frames. In addition, the system is configured to insert the first set of object channel frames and the first set of object related metadata frames into a respective set of object channel substream entities of the plurality of substream entities of the first container. Furthermore, the system is configured to insert presentation data into the presentation section, wherein the presentation data is indicative of at least one presentation, and wherein the at least one presentation comprises a set of substream entities from the plurality of substream entities which are to be presented simultaneously.

According to another aspect, a system for generating a personalized audio program from a bitstream comprising an object based audio program is described. The bitstream is as described in the present document. The system is configured to extract presentation data from the presentation section, wherein the presentation data is indicative of a presentation for the personalized audio program, and wherein the presentation comprises a set of substream entities from the plurality of substream entities which are to be presented simultaneously. Furthermore, the system is configured to extract, based on the presentation data, one or more object channel frames and corresponding one or more object related metadata frames from the set of object channel substream entities of the first container.

According to a further aspect, a software program is described. The software program may be adapted for execution on a processor and for performing the method steps outlined in the present document when carried out on the processor.

According to another aspect, a storage medium is described. The storage medium may comprise a software program adapted for execution on a processor and for performing the method steps outlined in the present document when carried out on the processor.

According to a further aspect, a computer program product is described. The computer program may comprise executable instructions for performing the method steps outlined in the present document when executed on a computer.

It should be noted that the methods and systems including its preferred embodiments as outlined in the present patent application may be used stand-alone or in combination with the other methods and systems disclosed in this document. Furthermore, all aspects of the methods and systems outlined in the present patent application may be arbitrarily combined. In particular, the features of the claims may be combined with one another in an arbitrary manner.

SHORT DESCRIPTION OF THE FIGURES

The invention is explained below in an exemplary manner with reference to the accompanying drawings, wherein FIG. 1 shows a block diagram of an example audio processing chain;

FIG. 6 shows a flow chart of an example method for generating a bitstream comprising presentation data.

DETAILED DESCRIPTION

As indicated above, the present document is directed at the technical problem of providing a bitstream for a generic audio program which allows a decoder of the bitstream to generate a personalized audio program from the bitstream in a resource efficient manner. In particular, the generation of the personalized audio program should be performed with relatively low computational complexity. Furthermore, the bitstream which comprises the generic audio program should exhibit a relatively low bitrate.

Figure 1:
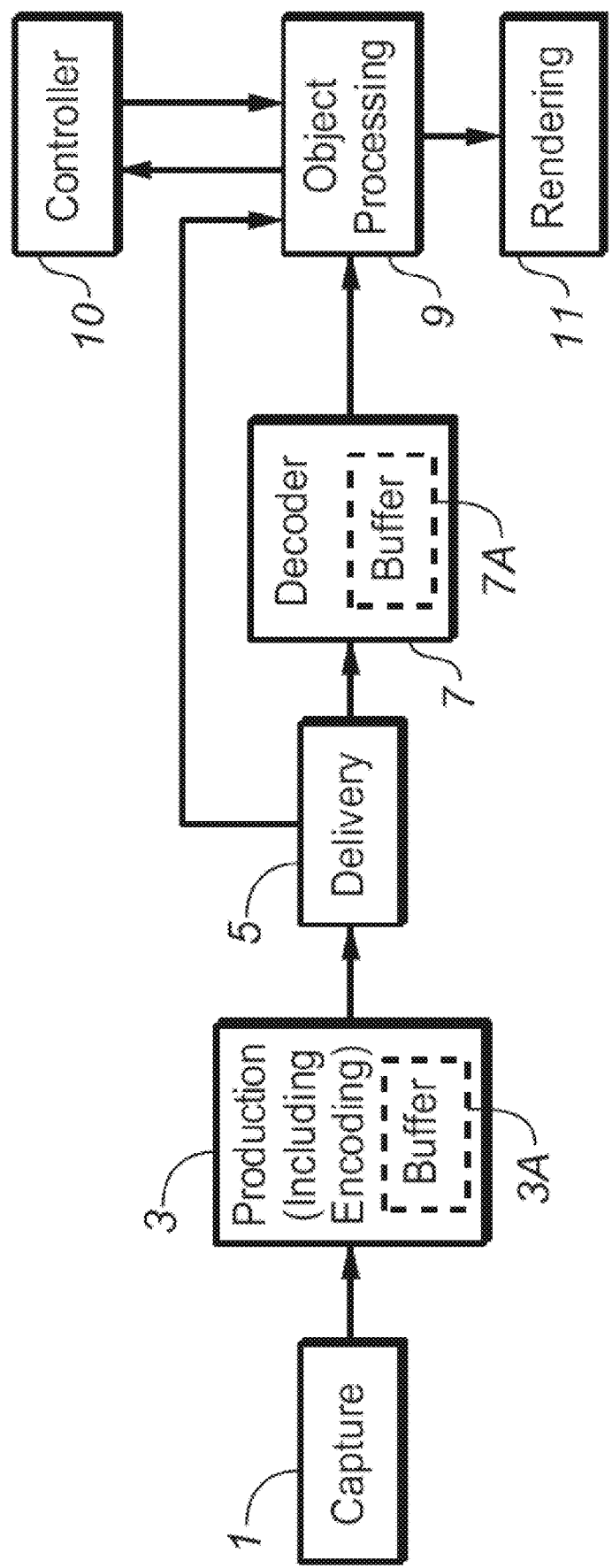

FIG. 1 shows a block diagram of an example audio processing chain (also referred to as an audio data processing system). The system includes the followings elements, coupled together as shown: a capture unit 1, a production unit 3 (which includes an encoding subsystem), a delivery subsystem 5, a decoder 7, an object processing subsystem 9, a controller 10, and a rendering subsystem 11. In variations on the system shown, one or more of the elements are omitted, or additional audio data processing units are included. Typically, elements 7, 9, 10, and 11 are included in a playback and/or decoding system (e.g., an end user's home theater system).

Capture unit 1 is typically configured to generate PCM (time-domain) samples comprising audio content, and to output the PCM samples. The samples may be indicative of multiple streams of audio captured by microphones (e.g., at a sporting event or other spectator event). Production unit 3, typically operated by a broadcaster, is configured to accept the PCM samples as input and to output an object based audio program indicative of the audio content. The program typically is or includes an encoded (e.g., compressed) audio bitstream indicative of the audio content and presentation data which allows different personalized audio programs to be derived from the bitstream. The data of the encoded bitstream that are indicative of the audio content are sometimes referred to herein as "audio data". The object based audio program output from unit 3 may be indicative of (i.e., may include) multiple speaker channels (a "bed" of speaker channels) of audio data, multiple object channels of audio data, and object related metadata. The audio program may comprise presentation data which may be used to select different combinations of speaker channels and/or object channels in order to generate different personalized audio programs (which may also be referred to as different experiences). By way of example, the object based audio program may include a main mix which in turn includes audio content indicative of a bed of speaker channels, audio content indicative of at least one user-selectable object channel (and optional at least one other object channel), and object related metadata associated with each object channel. The program may also include at least one side mix which includes audio content indicative of at least one other object channel (e.g., at least one user-selectable object channel) and/or object related metadata. The audio program may be indicative of one or more beds, or no bed, of speaker channels. For example, the audio program (or a particular mix/presentation) may be indicative of two or more beds of speaker channels (e.g., a 5.1 channel neutral crowd noise bed, a 2.0 channel home team crowd noise bed, and a 2.0 away team crowd noise bed), including at least one user-selectable bed (which can be selected using a user interface employed for user selection of object channel content or configuration) and a default bed (which will be rendered in the absence of user selection of another bed). The default bed may be determined by data indicative of a configuration (e.g., the initial configuration) of the speaker set of the playback system, and optionally the user may select another bed to be rendered in place of the default bed.

Delivery subsystem 5 of FIG. 1 is configured to store and/or transmit (e.g., broadcast) the audio program generated by unit 3. Decoder 7 accepts (receives or reads) the audio program delivered by delivery subsystem 5, and decodes the program (or one or more accepted elements thereof). Object processing subsystem 9 is coupled to receive (from decoder 7) decoded speaker channels, object channels, and object related metadata of the delivered audio program. Subsystem 9 is coupled and configured to output to rendering subsystem 11 a selected subset of the full set of object channels indicated by the audio program, and corresponding object related metadata. Subsystem 9 is typically also configured to pass through unchanged (to subsystem 11) the decoded speaker channels from decoder 7.

The object channel selection performed by subsystem 9 may be determined by user selection(s) (as indicated by control data asserted to subsystem 9 from controller 10) and/or rules (e.g., indicative of conditions and/or constraints) which subsystem 9 has been programmed or otherwise configured to implement. Such rules may be determined by object related metadata of the audio program and/or by other data (e.g., data indicative of the capabilities and organization of the playback system's speaker array) asserted to subsystem 9 (e.g., from controller 10 or another external source) and/or by preconfiguring (e.g., programming) subsystem 9. Controller 10 (via a user interface implemented by controller 10) may provide (e.g., display on a touch screen) to the user a menu or palette of selectable "preset" mixes or presentation of objects and "bed" speaker channel content. The selectable preset mixes or presentations may be determined by presentation data comprised within the audio program and possibly also by rules implemented by subsystem 9 (e.g., rules which subsystem 9 has been preconfigured to implement). The user selects from among the selectable mixes/presentations by entering commands to controller 10 (e.g., by actuating a touch screen thereof), and in response, controller 10 asserts corresponding control data to subsystem 9.

Rendering subsystem 11 of FIG. 1 is configured to render the audio content determined by the output of subsystem 9, for playback by the speakers (not shown) of the playback system. Subsystem 11 is configured to map, to the available speaker channels, the audio objects determined by the object channels selected by object processing subsystem 9 (e.g., default objects, and/or user-selected objects which have been selected as a result of user interaction using controller 10), using rendering parameters output from subsystem 9 (e.g., user-selected and/or default values of spatial position and level) which are associated with each selected object. At least some of the rendering parameters may be determined by the object related metadata output from subsystem 9. Rendering system 11 also receives the bed of speaker channels passed through by subsystem 9. Typically, subsystem 11 is an intelligent mixer, and is configured to determine speaker feeds for the available speakers including by mapping one or more selected (e.g., default-selected) objects to each of a number of individual speaker channels, and mixing the objects with "bed" audio content indicated by each corresponding speaker channel of the program's speaker channel bed.

Figure 2:
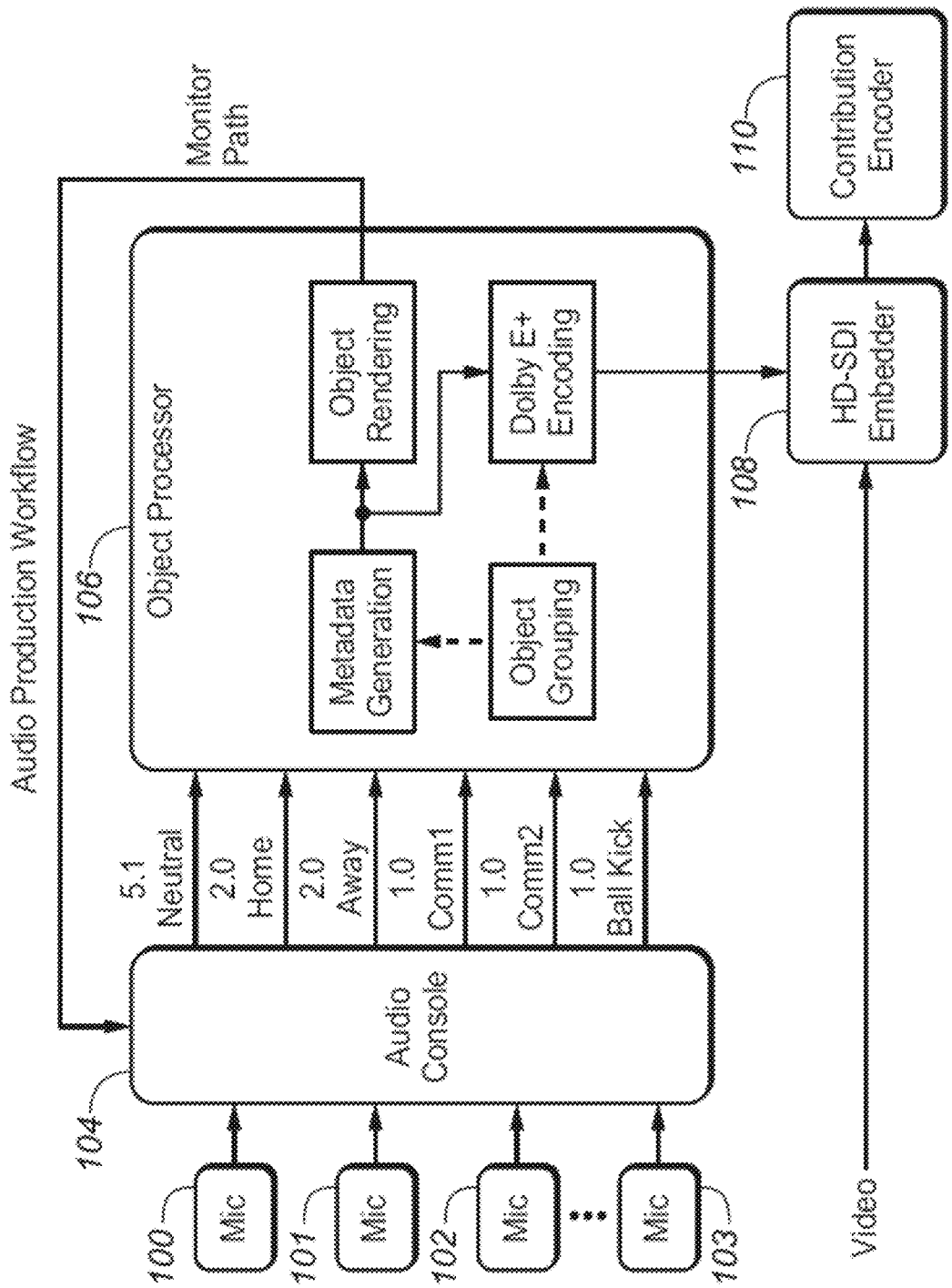
FIG. 2 shows a block diagram of an example audio encoder.

FIG. 2 is a block diagram of a broadcast system configured to generate an object based audio program (and a corresponding video program) for broadcast. A set of X microphones (where X is an integer greater than 0, 1 or 2), including microphones 100, 101, 102, and 103, of the FIG. 2 system are positioned to capture audio content to be included in the audio program, and their outputs are coupled to inputs of audio console 104. The audio program may include interactive audio content which is indicative of the atmosphere in or at, and/or commentary on a spectator event (e.g., a soccer or rugby game, a car or motorcycle race, or another sporting event). The audio program may comprise multiple audio objects (including user-selectable objects or object sets, and typically also a default set of objects to be rendered in the absence of object selection by the user) and a mix (or "bed") of speaker channels of the audio program. The bed of speaker channels may be a conventional mix (e.g., a 5.1 channel mix) of speaker channels of a type that might be included in a conventional broadcast program which does not include an object channel.

A subset of the microphones (e.g., microphones 100 and 101 and optionally also other microphones whose outputs are coupled to audio console 104) may be a conventional array of microphones which, in operation, captures audio (to be encoded and delivered as a bed of speaker channels). In operation, another subset of the microphones (e.g., microphones 102 and 103 and optionally also other microphones whose outputs are coupled to audio console 104) captures audio (e.g., crowd noise and/or other "objects") to be encoded and delivered as object channels of the program. For example, the microphone array of the FIG. 2 system may include: at least one microphone (e.g., microphone 100) implemented as a soundfield microphone and permanently installed in a stadium; at least one stereo microphone (e.g., microphone 102, implemented as a Sennheiser MKH416 microphone or another stereo microphone) pointed at the location of spectators who support one team (e.g., the home team), and at least one other stereo microphone (e.g., microphone 103, implemented as a Sennheiser MKH416 microphone or another stereo microphone) pointed at the location of spectators who support the other team (e.g., the visiting team).

The broadcasting system of FIG. 2 may include a mobile unit (which may be a truck, and is sometimes referred to as a "match truck") located outside of a stadium (or other event location), which is the first recipient of audio feeds from microphones in the stadium (or other event location). The match truck generates the object based audio program (to be broadcast) including by encoding audio content from microphones for delivery as object channels of the audio program, generating corresponding object related metadata (e.g., metadata indicative of spatial location at which each object should be rendered) and including such metadata in the audio program, and/or encoding audio content from some microphones for delivery as a bed of speaker channels of the audio program.

For example, in the FIG. 2 system, console 104, object processing subsystem 106 (coupled to the outputs of console 104), embedding subsystem 108, and contribution encoder 110 may be installed in a match truck. The object based audio program generated in subsystem 106 may be combined (e.g., in subsystem 108) with video content (e.g., from cameras positioned in the stadium) to generate a combined audio and video signal which is then encoded (e.g., by encoder 110), thereby generating an encoded audio/video signal for broadcast (e.g., by delivery subsystem 5 of FIG. 1). It should be understood that a playback system which decodes and renders such an encoded audio/video signal would include a subsystem (not specifically shown in the drawings) for parsing the audio content and the video content of the delivered audio/video signal, and a subsystem for decoding and rendering the audio content, and another subsystem (not specifically shown in the drawings) for decoding and rendering the video content.

The audio output of console 104 may include a 5.1 speaker channel bed (labeled "5.1 neutral" in FIG. 2) e.g. indicative of sound captured at a sporting event, audio content of a stereo object channel (labeled "2.0 home") e.g. indicative of crowd noise from the home team's fans who are present at the event, audio content of a stereo object channel (labeled "2.0 away") e.g. indicative of crowd noise from the visiting team's fans who are present at the event, object channel audio content (labeled "1.0 comm1") e.g. indicative of commentary by an announcer from the home team's city, object channel audio content (labeled "1.0 comm2") e.g. indicative of commentary by an announcer from the visiting team's city, and object channel audio content (labeled "1.0 ball kick") e.g. indicative of sound produced by a game ball as it is struck by sporting event participants.

Object processing subsystem 106 is configured to organize (e.g., group) audio streams from console 104 into object channels (e.g., to group the left and right audio streams labeled "2.0 away" into a visiting crowd noise object channel) and/or sets of object channels, to generate object related metadata indicative of the object channels (and/or object channel sets), and to encode the object channels (and/or object channel sets), object related metadata, and the speaker channel bed (determined from audio streams from console 104) as an object based audio program (e.g., an object based audio program encoded as an AC-4 bitstream).

Alternatively, the encoder 110 may be configured to generate the object based audio program, which may be encoded e.g. as an AC-4 bitstream. In such cases, the object processing subsystem 106 may be focused on producing audio content (e.g. using a Dolby E+ format), whereas the encoder 110 may be focused on generating a bitstream for emission or distribution.

Subsystem 106 may further be configured to render (and play on a set of studio monitor speakers) at least a selected subset of the object channels (and/or object channel sets) and the speaker channel bed (including by using the object related metadata to generate a mix/presentation indicative of the selected object channel(s) and speaker channels) so that the played back sound can be monitored by the operator(s) of console 104 and subsystem 106 (as indicated by the "monitor path" of FIG. 2).

The interface between subsystem 104's outputs and subsystem 106's inputs may be a multichannel audio digital interface ("MADI").

In operation, subsystem 108 of the FIG. 2 system may combine the object based audio program generated in subsystem 106 with video content (e.g., from cameras positioned in a stadium) to generate a combined audio and video signal which is asserted to encoder 110. The interface between subsystem 108's output and subsystem 110's input may be a high definition serial digital interface ("HD-SDI"). In operation, encoder 110 encodes the output of subsystem 108, thereby generating an encoded audio/video signal for broadcast (e.g., by delivery subsystem 5 of FIG. 1).

A broadcast facility (e.g., subsystems 106, 108, and 110 of the FIG. 2 system) may be configured to generate different presentations of elements of an object based audio program. Examples of such presentations comprise a 5.1 flattened mix, an international mix, and a domestic mix. For example, all the presentations may include a common bed of speaker channels, but the object channels of the presentations (and/or the menu of selectable object channels determined by the presentations, and/or selectable or non-selectable rendering parameters for rendering and mixing the object channels) may differ from presentation to presentation.

Object related metadata of an audio program (or a pre-configuration of the playback or rendering system, not indicated by metadata delivered with the audio program) may provide constraints or conditions on selectable mixes/presentations of objects and bed (speaker channel) content. For example, a DRM hierarchy may be implemented to allow a user to have tiered access to a set of object channels included in an object based audio program. If the user pays more money (e.g., to the broadcaster), the user may be authorized to decode, select, and render more object channels of the audio program.

Figure 3:
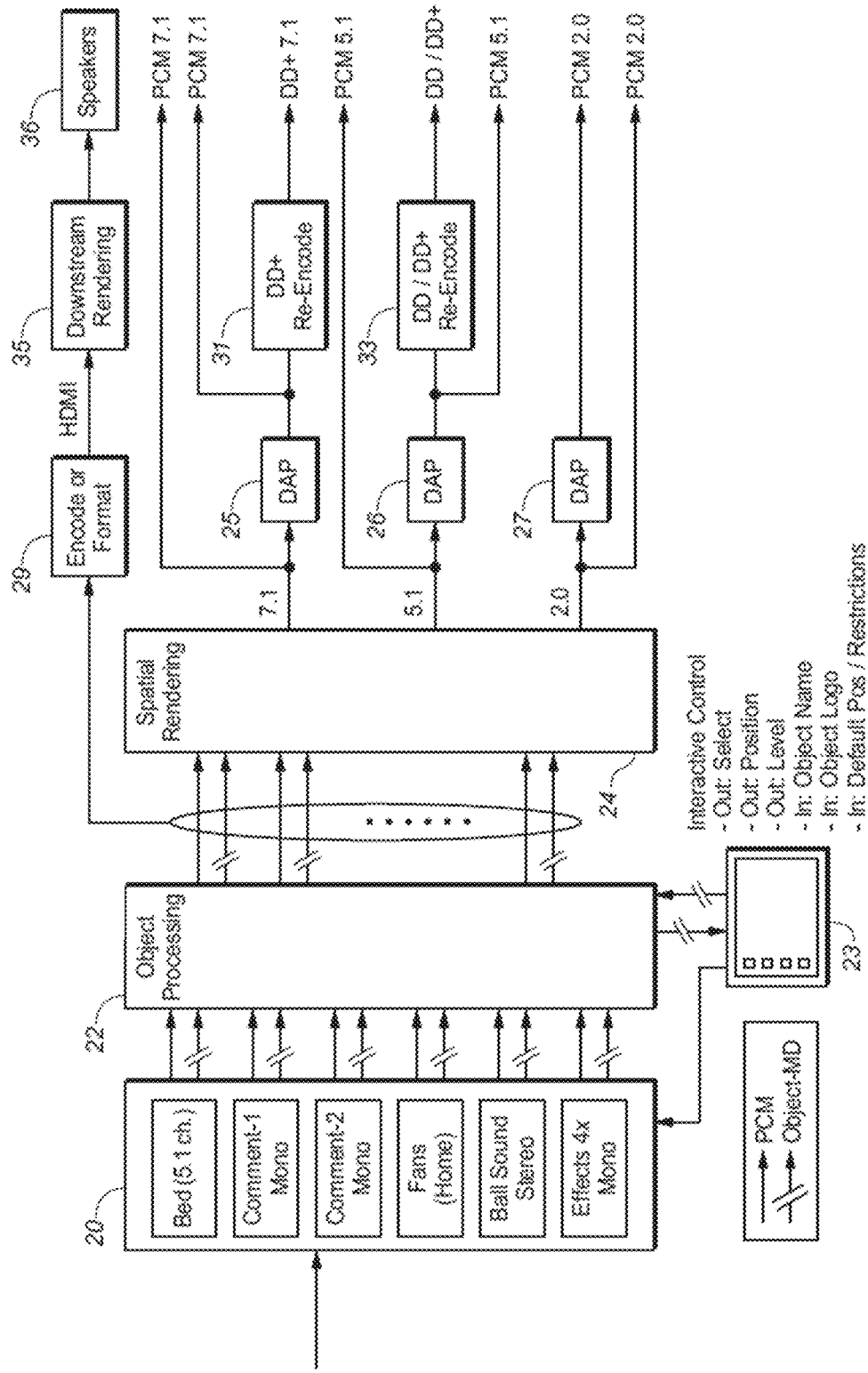
FIG. 3 shows a block diagram of an example audio decoder.

FIG. 3 is a block diagram of an example playback system which includes decoder 20, object processing subsystem 22, spatial rendering subsystem 24, controller 23 (which implements a user interface), and optionally also digital audio processing subsystems 25, 26, and 27, coupled as shown. In some implementations, elements 20, 22, 24, 25, 26, 27, 29, 31, and 33 of the FIG. 3 system are implemented as a set top device.

In the system of FIG. 3, decoder 20 is configured to receive and decode an encoded signal indicative of object based audio program. The audio program is indicative of audio content including e.g. two speaker channels (i.e., a "bed" of at least two speaker channels). The audio program is also indicative of at least one user-selectable object channel (and optionally at least one other object channel) and object related metadata corresponding to each object channel. Each object channel is indicative of an audio object, and thus object channels are sometimes referred to herein as "objects" for convenience. The audio program may be comprised within an AC-4 bitstream, indicative of audio objects, object-related metadata, and/or a bed of speaker channels. Typically, the individual audio objects are either mono or stereo coded (i.e., each object channel is indicative of a left or right channel of an object, or is a monophonic channel indicative of an object), the bed may be a traditional 5.1 mix, and decoder 20 may be configured to decode a pre-determined number (e.g. 16 or more) of channels of audio content (including e.g. six speaker channels of the bed, and e.g. ten or more object channels) simultaneously. The incoming bitstream may be indicative of a certain number of (e.g. more than ten) audio objects, and not all of them may need to be decoded to achieve a specific mix/presentation.

As indicated above, the audio program may comprise zero, one or more beds of speaker channels as well as one or more object channels. A bed of speaker channels and/or an object channel may form a substream of the bitstream which comprises the audio program. Hence, the bitstream may comprise a plurality of substreams, wherein a substream is indicative of a bed of speaker channels or of one or more object channels. Furthermore, the bitstream may comprise presentation data (e.g. comprised within a presentation section of the bitstream), wherein the presentation data may be indicative of one or more different presentations. A presentation may define a particular mix of substreams. In other words, a presentation may define a bed of speaker channels and/or one or more object channels which are to be mixed together in order to provide a personalized audio program.

Figure 4:
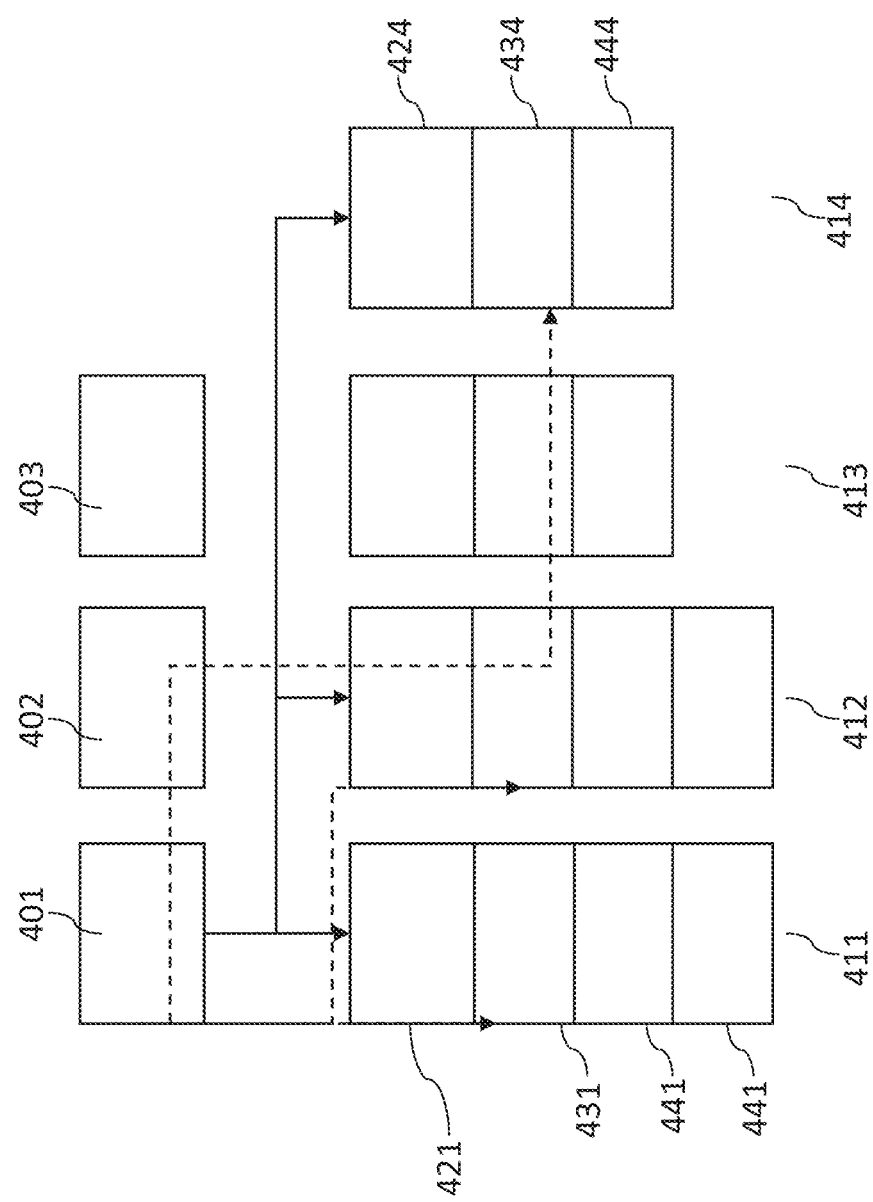
FIG. 4 shows example presentation data and example substreams of an audio program.

FIG. 4 illustrates a plurality of substreams 411, 412, 413, 414. Each substream 411, 412, 413, 414 comprises audio data 421, 424, wherein the audio data 421, 424 may correspond to a bed of speaker channels or to the audio data of an audio object (i.e. to an audio channel). By way of example, the substream 411 may comprise a bed of speaker channels 421 and the substream 414 may comprise an object channel 424. Furthermore, each substream 411, 412, 413, 414 may comprise metadata 431, 434 (e.g. default metadata) which is associated with the audio data 421, 424 and which may be used for rendering the associated audio data 421, 424. By way of example, the substream 411 may comprise speaker related metadata (for a bed of speaker channels 421) and the substream 414 may comprise object related metadata (for an object channel 424). In addition, a substream 411, 412, 413, 414 may comprise alternative metadata 441, 444, in order to provide one or more alternative ways for rendering the associated audio data 421, 424.

Furthermore, FIG. 4 shows different presentations 401, 402, 403. A presentation 401 is indicative of a selection of substreams 411, 412, 413, 414 which are to be used for the presentation 401, thereby defining a personalized audio program. Furthermore, a presentation 401 may be indicative of the metadata 431, 441 (e.g. the default metadata 431 or one of the alternative metadata 441) which is to be used for a selected substream 411 for the presentation 401. In the illustrated example, the presentation 401 describes a personalized audio program which comprises the substreams 411, 412, 414.

As such, the use of presentations 401, 402, 403 provides an efficient means for signaling different personalized audio programs within a generic object based audio program. In particular, the presentations 401, 402, 403 may be such that a decoder 7, 20 can easily select the one or more substreams 411, 412, 413, 414 which are required for a particular presentation 401, without the need for decoding the complete bitstream of the generic object based audio program. Furthermore, a re-multiplexer (not shown in FIG. 3) may be configured to easily extract the one or more substreams 411, 412, 413, 414 from the complete bitstream, in order to generate a new bitstream for the personalized audio program of the particular presentation 401. In other words, from a bitstream with a relatively large number of presentations 401, 402, 403, a new bitstream may be generated efficiently that carries a reduced number of presentations. A possible scenario is a relatively large bitstream with a relatively high number of presentations arriving at an STB. The STB may be focused on personalization (i.e. on selecting a presentation) and may be configured to repackage a single-presentation bitstream (without decoding the audio data). The single-presentation bitstream (and the audio data) may then be decoded at an appropriate, remote decoder, e.g. within an AVR (Audio/Video receiver) or within a mobile home device such as a tablet PC.

The decoder (e.g., decoder 20 of FIG. 3) may parse the presentation data in order to identify a presentation 401 for rendering. Furthermore, the decoder 200 may extract the substreams 411, 412, 414 which are required for the presentation 401 from the locations indicated by the presentation data. After extracting the substreams 411, 412, 414 (speaker channels, object channels and associated metadata), the decoder may perform any necessary decoding (e.g. only) on the extracted substreams 411, 412, 414.

The bitstream may be an AC-4 bitstream and the presentations 401, 402, 403 may be AC-4 presentations. These presentations enable an easy access to the parts of a bitstream (audio data 421 and metadata 431) that are needed for a particular presentation. In that way, a decoder or receiver system 20 can easily access the needed parts of a bitstream without the need to parse deeply into other parts of a bitstream. This for instance also enables the possibility to only forward the required parts of a bitstream to another device without the need to re-build the whole structure or even to decode and encode substreams 411, 412, 413, 414 of the bitstream. In particular, a reduced structure which is derived from the bitstream may be extracted.

With reference again to FIG. 3, a user may employ controller 23 to select objects (indicated by the object based audio program) to be rendered. By way of example, the user may select a particular presentation 401. Controller 23 may be a handheld processing device (e.g., an iPad) which is programmed to implement a user interface (e.g., an iPad App) compatible with the other elements of the FIG. 3 system. The user interface may provide (e.g., display on a touch screen) to the user a menu or palette of selectable presentations 401, 402, 403 (e.g. "preset" mixes) of objects and/or "bed" speaker channel content. The presentations 401, 402, 403 may be provided along with a name tag within the menu or palette. The selectable presentations 401, 402, 403 may be determined by presentation data of the bitstream and possibly also by rules implemented by subsystem 22 (e.g., rules which subsystem 22 has been preconfigured to implement). The user may select from among the selectable presentations by entering commands to controller 23 (e.g., by actuating a touch screen thereof), and in response, controller 23 may assert corresponding control data to subsystem 22.

In response to the object based audio program, and in response to control data from controller 23 indicative of the selected presentation 401, decoder 20 decodes (if necessary) the speaker channels of the bed of speaker channels of a selected presentation 401, and outputs to subsystem 22 decoded speaker channels. In response to the object based audio program, and in response to control data from controller 23 indicative of the selected presentation 401, decoder 20 decodes (if necessary) the selected object channels, and outputs to subsystem 22 the selected (e.g., decoded) object channels (each of which may be a pulse code modulated or "PCM" bitstream), and object related metadata corresponding to the selected object channels.

The objects indicated by the decoded object channels typically are or include user-selectable audio objects. For example, as indicated in FIG. 3, the decoder 20 may extract a 5.1 speaker channel bed, an object channel ("Comment-1 mono") indicative of commentary by an announcer from the home team's city, an object channel ("Comment-2 mono") indicative of commentary by an announcer from the visiting team's city, an object channel ("Fans (home)") indicative of crowd noise from the home team's fans who are present at a sporting event, left and right object channels ("Ball Sound stereo") indicative of sound produced by a game ball as it is struck by sporting event participants, and four object channels ("Effects 4x mono") indicative of special effects. Any of the "Comment-1 mono," "Comment-2 mono," "Fans (home)," "Ball Sound stereo," and "Effects 4x mono" object channels may be selected as part of a presentation 401, and each selected one of them would be passed from subsystem 22 to rendering subsystem 24 (after undergoing any necessary decoding in decoder 20).

Subsystem 22 is configured to output a selected subset of the full set of object channels indicated by the audio program, and corresponding object related metadata of the audio program. The object selection may be determined by user selections (as indicated by control data asserted to subsystem 22 from controller 23) and/or rules (e.g., indicative of conditions and/or constraints) which subsystem 22 has been programmed or otherwise configured to implement. Such rules may be determined by object related metadata of the program and/or by other data (e.g., data indicative of the capabilities and organization of the playback system's speaker array) asserted to subsystem 22 (e.g., from controller 23 or another external source) and/or by preconfiguring (e.g., programming) subsystem 22. As indicated above, the bitstream may comprise presentation data providing a set of selectable "preset" mixes (i.e. presentations 401, 402, 403) of objects and "bed" speaker channel content. Subsystem 22 typically passes through unchanged (to subsystem 24) the decoded speaker channels from decoder 20, and processes selected ones of the object channels asserted thereto.

Spatial rendering subsystem 24 of FIG. 3 (or subsystem 24 with at least one downstream device or system) is configured to render the audio content output from subsystem 22 for playback by speakers of the user's playback system. One or more of optionally included digital audio processing subsystems 25, 26, and 27 may implement post-processing on the output of subsystem 24.

Spatial rendering subsystem 24 is configured to map, to the available speaker channels, the audio object channels selected by object processing subsystem 22, using rendering parameters output from subsystem 22 (e.g., user-selected and/or default values of spatial position and level) which are associated with each selected object. Spatial rendering system 24 also receives a decoded bed of speaker channels passed through by subsystem 22. Typically, subsystem 24 is an intelligent mixer, and is configured to determine speaker feeds for the available speakers including by mapping one, two, or more than two selected object channels to each of a number of individual speaker channels, and mixing the selected object channel(s) with "bed" audio content indicated by each corresponding speaker channel of the program's speaker channel bed.

The speakers to be driven to render the audio may be located in arbitrary locations in the playback environment; not merely in a (nominally) horizontal plane. In some such cases, metadata included in the program indicates rendering parameters for rendering at least one object of the program at any apparent spatial location (in a three dimensional volume) using a three-dimensional array of speakers. For example, an object channel may have corresponding metadata indicating a three-dimensional trajectory of apparent spatial positions at which the object (indicated by the object channel) is to be rendered. The trajectory may include a sequence of "floor" locations (in the plane of a subset of speakers which are assumed to be located on the floor, or in another horizontal plane, of the playback environment), and a sequence of "above-floor" locations (each determined by driving a subset of the speakers which are assumed to be located in at least one other horizontal plane of the playback environment). In such cases, the rendering can be performed in accordance with the present invention so that the speakers can be driven to emit sound (determined by the relevant object channel) that will be perceived as emitting from a sequence of object locations in the three-dimensional space which includes the trajectory, mixed with sound determined by the "bed" audio content. Subsystem 24 may be configured to implement such rendering, or steps thereof, with remaining steps of the rendering being performed by a downstream system or device (e.g., rendering subsystem 35 of FIG. 3).

Optionally, a digital audio processing (DAP) stage (e.g., one for each of a number of predetermined output speaker channel configurations) is coupled to the output of spatial rendering subsystem 24 to perform post-processing on the output of the spatial rendering subsystem. Examples of such processing include intelligent equalization or (in case of a stereo output) speaker virtualization processing.

The output of the FIG. 3 system (e.g., the output of the spatial rendering subsystem, or a DAP stage following the spatial rendering stage) may be PCM bitstreams (which determine speaker feeds for the available speakers). For example, in the case that the user's playback system includes a 7.1 array of speakers, the system may output PCM bitstreams (generated in subsystem 24) which determine speaker feeds for the speakers of such array, or a post-processed version (generated in DAP 25) of such bitstreams. For another example, in the case that the user's playback system includes a 5.1 array of speakers, the system may output PCM bitstreams (generated in subsystem 24) which determine speaker feeds for the speakers of such array, or a post-processed version (generated in DAP 26) of such bitstreams. For another example, in the case that the user's playback system includes only left and right speakers, the system may output PCM bitstreams (generated in subsystem 24) which determine speaker feeds for the left and right speakers, or a post-processed version (generated in DAP 27) of such bitstreams.

The FIG. 3 system optionally also includes one or both of re-encoding subsystems 31 and 33. Re-encoding subsystem 31 is configured to re-encode the PCM bitstream (indicative of feeds for a 7.1 speaker array) output from DAP 25 as an encoded bitstream (e.g. an AC-4 or AC-3 bitstream), and the resulting encoded (compressed) AC-3 bitstream may be output from the system. Re-encoding subsystem 33 is configured to re-encode the PCM bitstream (indicative of feeds for a 5.1 speaker array) output from DAP 27 as an encoded bitstream (e.g. an AC-4 or AC-3 bitstream), and the resulting encoded (compressed) bitstream may be output from the system.

The FIG. 3 system optionally also includes re-encoding (or formatting) subsystem 29 and downstream rendering subsystem 35 coupled to receive the output of subsystem 29. Subsystem 29 is coupled to receive data (output from subsystem 22) indicative of the selected audio objects (or default mix of audio objects), corresponding object related metadata, and the bed of speaker channels, and is configured to re-encode (and/or format) such data for rendering by subsystem 35. Subsystem 35, which may be implemented in an AVR or soundbar (or other system or device downstream from subsystem 29), is configured to generate speaker feeds (or bitstreams which determine speaker feeds) for the available playback speakers (speaker array 36), in response to the output of subsystem 29. For example, subsystem 29 may be configured to generate encoded audio, by re-encoding the data indicative of the selected (or default) audio objects, corresponding metadata, and bed of speaker channels, into a suitable format for rendering in subsystem 35, and to transmit the encoded audio (e.g., via an HDMI link) to subsystem 35. In response to speaker feeds generated by (or determined by the output of) subsystem 35, the available speakers 36 would emit sound indicative of a mix of the speaker channel bed and the selected (or default) object(s), with the object(s) having apparent source location(s) determined by object related metadata of subsystem 29's output. When subsystems 29 and 35 are included, rendering subsystem 24 is optionally omitted from the system.

As indicated above, the use of presentation data is beneficial as it enables the decoder 20 to efficiently select the one or more substreams 411, 412, 413, 414 which are required for a particular presentation 401. In view of this, the decoder 20 may be configured to extract the one or more substreams 411, 412, 413, 414 of a particular presentation 401, and to rebuild a new bitstream which (typically only) comprises the one or more substreams 411, 412, 413, 414 of the particular presentation 401. This extraction and rebuilding of a new bitstream may be performed without the need for actually decoding and re-encoding the one or more substreams 411, 412, 413, 414. Hence, the generation of the new bitstream for the particular presentation 401 may be performed in a resource efficient manner.

The system of FIG. 3 may be a distributed system for rendering object based audio, in which a portion (i.e., at least one step) of the rendering (e.g., selection of audio objects to be rendered and selection of characteristics of the rendering of each selected object, as performed by subsystem 22 and controller 23 of the FIG. 3 system) is implemented in a first subsystem (e.g., elements 20, 22, and 23 of FIG. 3, implemented in a set top device, or a set top device and a handheld controller) and another portion of the rendering (e.g., immersive rendering in which speaker feeds, or signals which determine speaker feeds, are generated in response to the output of the first subsystem) is implemented in a second subsystem (e.g., subsystem 35, implemented in an AVR or soundbar). Latency management may be provided to account for the different times at which and different subsystems in which portions of the audio rendering (and any processing of video which corresponds to the audio being rendered) are performed.

Figure 5:
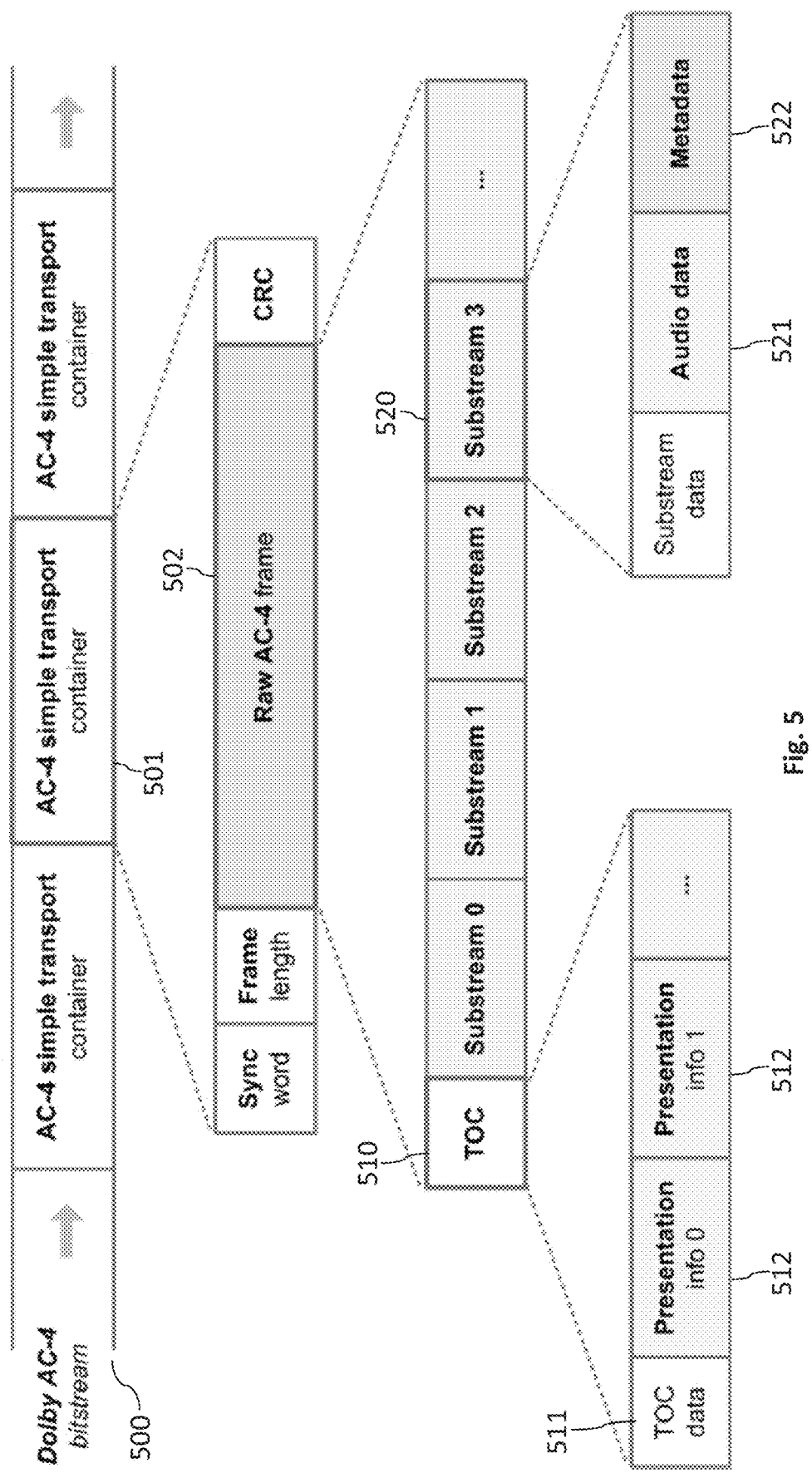
FIG. 5 shows an example structure of a bitstream comprising presentation data.

As illustrated in FIG. 5, the generic audio program may be transported in a bitstream 500 which comprises a sequence of containers 501. Each container 501 may comprise data of the audio program for a particular frame of the audio program. A particular frame of the audio program may correspond to a particular temporal segment of the audio program (e.g. 20 milliseconds of the audio program). Hence, each container 501 of the sequence of containers 501 may carry the data for a frame of a sequence of frames of the generic audio program. The data for a frame may be comprised within a frame entity 502 of a container 501. The frame entity may be identified using a syntax element of the bitstream 500.

As indicated above, the bitstream 500 may carry a plurality of substreams 411, 412, 413, 414, wherein each substream 411 comprises a bed of speaker channels 421 or an object channel 424. As such, a frame entity 502 may comprise a plurality of corresponding substream entities 520. Furthermore, a frame entity 502 may comprise a presentation section 510 (also referred to as a Table of Content, TOC, section). The presentation section 510 may comprise TOC data 511 which may indicate e.g. a number of presentations 401, 402, 403 comprised within the presentation section 510. Furthermore, the presentation section 510 may comprise one or more presentation entities 512 which carry data for defining one or more presentations 401, 402, 403, respectively. A substream entity 520 may comprise a content sub-entity 521 for carrying the audio data 421, 424 of a frame of a substream 411. Furthermore, a substream entity 520 may comprise a metadata sub-entity 522 for carrying the corresponding metadata 431, 441 of the frame of the substream 411.

FIG. 6 shows a flow chart of an example method 600 for generating a bitstream 500 which is indicative of an object based audio program (i.e. of a generic audio program). The bitstream 500 exhibits a bitstream format, such that the bitstream 500 comprises a sequence of containers 501 for a corresponding sequence of audio program frames of the object based audio program. In other words, each frame (i.e. each temporal segment) of the object based audio program may be inserted into a container of the sequence of containers, which may be defined by the bitstream format. A container may be defined using a particular container syntax element of the bitstream format. By way of example, the bitstream format may correspond to an AC-4 bitstream format. In other words, the to-be-generated bitstream 500 may be an AC-4 bitstream.

Furthermore, the bitstream format may be such that a first container 501 of the sequence of containers 501 (i.e. at least one of the containers 501 of the sequence of containers 501) comprises a plurality of substream entities 520 for a plurality of substreams 411, 412, 413, 414 of the object based audio program. As outlined above, an audio program may comprise a plurality of substreams 411, 412, 413, 414, wherein each substream 411, 412, 413, 414 may either comprise a bed of speaker channels 421 or an object channel 424 or both. The bitstream format may be such that each container 501 of the sequence of containers 501 provides a dedicated substream entity 520 for a corresponding substream 411, 412, 413, 414. In particular, each substream entity 520 may comprise the data relating to the frame of a corresponding substream 411, 412, 413, 414. The frame of a substream 411, 412, 413, 414 may be the frame of a bed of speaker channels 421, which is referred to herein as a speaker channel frame. Alternatively, the frame of a substream 411, 412, 413, 414 may be the frame of an object channel, which is referred to herein as an object channel frame. A substream entity 520 may be defined by a corresponding syntax element of the bitstream format.

Furthermore, the first container 501 may comprise a presentation section 510. In other words, the bitstream format may allow for the definition of a presentation section 510 (e.g. using an appropriate syntax element) for all of the containers 501 of a sequence of containers 501. The presentation section 510 may be used for defining different presentations 401, 402, 403 for different personalized audio programs that can be generated from the (generic) object based audio program.

The method 600 comprises determining 601 a set of object channels 424 which are indicative of audio content of at least some of a set of audio signals. The set of audio signals may be indicative of captured audio content, e.g. audio content which has been captured using a system described in the context of FIG. 2. The set of object channels 424 may comprise a plurality of object channels 424. Furthermore, the set of object channels 424 comprises a sequence of sets of object channel frames. In other words, each object channel comprises a sequence of object channel frames. By consequence, the set of object channels comprises a sequence of sets of object channel frames, wherein a set of object channel frames at a particular time instant comprises the object channel frames of the set of object channels at the particular time instant.

Furthermore, the method 600 comprises providing or determining 602 a set of object related metadata 434, 444 for the set of object channels 424, wherein the set of object related metadata 434, 444 comprises a sequence of sets of object related metadata frames. In other words, the object related metadata of an object channel is segmented into a sequence of object related metadata frames. By consequence, the set of object related metadata for the corresponding set of object channels comprises a sequence of sets of object related metadata frames.

As such, an object related metadata frame may be provided for a corresponding object channel frame (e.g. using the object processor 106 described in the context of FIG. 2). As indicated above, an object channel 424 may be provided with different variants of object related metadata 434, 444. By way of example, a default variant of object related metadata 434 and one or more alternative variants of object related metadata 444 may be provided. By doing this, different perspectives (e.g. different positions within a stadium) may be simulated. Alternatively or in addition, a bed of speaker channels 421 may be provided with different variants of speaker related metadata 431, 441. By way of example, a default variant of speaker related metadata 431 and one or more alternative variants of speaker related metadata 441 may be provided. By doing this, different rotations of the bed of speaker channels 421 may be defined. Similar to the object related metadata also the speaker related metadata may be time-variant.

As such, an audio program may comprise a set of object channels. By consequence, a first audio program frame of the object based audio program may comprise a first set of object channel frames from the sequence of sets of object channel frames and a corresponding first set of object related metadata frames from the sequence of sets of object related metadata frames.

The method 600 may further comprise inserting 603 the first set of object channel frames and the first set of object related metadata frames into a respective set of object channel substream entities 520 of the plurality of substream entities 520 of the first container 501. As such, a substream 411, 412, 413, 414 may be generated for each object channel 421 of the object based audio program. Each substream 411, 412, 413, 414 may be identified within the bitstream 500 via the respective substream entity 520 which carries the substream 411, 412, 413, 414. As a result of this, different substreams 411, 412, 413, 414 may be identified and possibility extracted by a decoder 7, 20 in a resource efficient manner, without the need for decoding the complete bitstream 500 and/or the substreams 411, 412, 413, 414.

Furthermore, the method 600 comprises inserting 604 presentation data into the presentation section 510 of the bitstream 500. The presentation data may be indicative of at least one presentation 401, wherein the at least one presentation 401 may define a personalized audio program. In particular, the at least one presentation 401 may comprise or may indicate a set of substream entities 520 from the plurality of substream entities 520 which are to be presented simultaneously. As such, a presentation 401 may indicate which one or more of the substreams 411, 412, 413, 414 of an object based audio program are to be selected for generating a personalized audio program. As outlined above, a presentation 401 may identify a subset of the complete set of substreams 411, 412, 413, 414 (i.e. less than the total number of substreams 411, 412, 413, 414).

The insertion of presentation data enables a corresponding decoder 7, 20 to identify and to extract one or more substreams 411, 412, 413, 414 from the bitstream 500 to generate a personalized audio program without the need for decoding or parsing the complete bitstream 500.

The method 600 may comprise determining a bed of speaker channels 421 which is indicative of audio content of one or more of the set of audio signals. The bed of speaker channels 421 may comprise one or more of: 2.0 channels, 5.1 channels, 5.1.2 channels, 7.1 channels and/or 7.1.4 channels. A bed of speaker channels 421 may be used to provide a basis for a personalized audio program. In addition, one or more object channels 424 may be used to provide personalized variations of the personalized audio program.

A bed of speaker channels 421 may comprise a sequence of speaker channel frames, and the first audio program frame of the object based audio program may comprise a first speaker channel frame of the sequence of speaker channel frames. The method 600 may further comprise inserting the first speaker channel frame into a speaker channel substream entity 520 of the plurality of substreams entities 520 of the first container 501. A presentation 401 of the presentation section 510 may then comprise or indicate the speaker channel substream entity 520. Alternatively or in addition, a presentation 401 may comprise or may indicate one or more object channel substream entities 520 from the set of object channel substream entities.

The method 600 may further comprise providing speaker related metadata 431, 441 for the bed of speaker channels 421. The speaker related metadata 431, 441 may comprise a sequence of speaker related metadata frames. A first speaker related metadata frame from the sequence of speaker related metadata frames may be inserted into the speaker channel substream entity 520. It should be noted that a plurality of beds of speaker channels 421 may be inserted into a corresponding plurality of speaker channel substream entities 520.

As outlined in the context of FIG. 4, the presentation data may be indicative of a plurality of presentations 401, 402, 403 comprising different sets of substream entities 520 for different personalized audio programs. The different sets of substream entities 520 may comprise different combinations of the one or more speaker channel substream entities 520, the one or more object channel substream entities 520 and/or different combinations of variants of metadata 434, 444 (e.g. default metadata 434 or alternative metadata 444).

The presentation data within the presentation section 510 may be segmented into different presentation data entities 512 for different presentations 401, 402, 403 (e.g. using an appropriate syntax element of the bitstream format). The method 600 may further comprise inserting table of content (TOC) data into the presentation section 510. The TOC data may be indicative of a position of the different presentation data entities 512 within the presentation section 510 and/or an identifier for the different presentations 401, 402, 403 comprised within the presentation section 510. As such, the TOC data may be used by a corresponding decoder 7, 20 to identify and extract the different presentations 401, 402, 403 in an efficient manner. Alternatively or in addition, the presentation data entities 512 for the different presentations 401, 402, 403 may be comprised sequentially within the presentation section 510. If the TOC data is not indicative of the positions of the different presentation data entities 512, a corresponding decoder 7, 20 may identify and extract the different presentations 401, 402, 403 by parsing sequentially through the different presentation data entities 512. This may be a bit-rate efficient method for signaling the different presentations 401, 402, 403.

A substream entity 520 may comprise a content sub-entity 521 for audio content or audio data 424 and a metadata sub-entity 522 for related metadata 434, 444. The sub-entities 521, 522 may be identified by appropriate syntax elements of the bitstream format. By doing this, a corresponding decoder 7, 20 may identify the audio data and the corresponding metadata of an object channel or of a bed of speaker channels in a resource efficient manner.

As already indicated above, a metadata frame for a corresponding channel frame may comprise a plurality of different variants or groups 434, 444 of metadata. A presentation 401 may be indicative of which variant or group 434 of metadata is to be used for rendering the corresponding channel frame. By doing this, a degree of personalization of an audio program (e.g. a listening/viewing perspective) may be increased.

A bed of speaker channels 421 typically comprises one or more speaker channels to be presented by one or more speakers 36, respectively, of a presentation environment. On the other hand, an object channel 424 is typically to be presented by a combination of speakers 36 of the presentation environment. The object related metadata 434, 444 of an object channel 424 may be indicative of a position within the presentation environment from which the object channel 424 is to be rendered. The position of the object channel 424 may be time-varying. As a result of this, a combination of speakers 36 for rendering the object channel 424 may change along the sequence of object channel frames of an object channel 424 and/or a panning of the speakers 36 of the combination of speakers may change along the sequence of object channel frames of the object channel 424.

A presentation 401, 402, 403 may comprise target device configuration data for a target device configuration. In other words, a presentation 401, 402, 403 may be dependent on the target device configuration which is used for rendering of the presentation 401, 402, 403. Target device configurations may differ with regards to the number of speakers, the positions of the speakers and/or with regards to the number of audio channels which may be processed and rendered. Example target device configurations are a 2.0 (stereo) target device configuration with a left and a right loudspeaker, or a 5.1 target device configuration, etc. The target device configuration typically comprises a spatial rendering subsystem 24, as described in the context of FIG. 3.

As such, a presentation 401, 402, 403 may indicate different audio resources to be used for different target device configurations. The target device configuration data may be indicative of a set of substream entities 520 from the plurality of substream entities 520 and/or of a variant 434 of metadata, which are to be used for rendering the presentation 401 on a particular target device configuration. In particular, the target device configuration data may indicate such information for a plurality of different target device configurations. By way of example, a presentation 401 may comprise different sections with target device configuration data for different target device configurations.

By doing this, a corresponding decoder or de-multiplexer may efficiently identify the audio resources (one or more substreams 411, 412, 413, 414, one or more variants 441 of metadata) which are to be used for a particular target device configuration.

The bitstream format may allow for a further (intermediate) layer for defining a personalized audio program. In particular, the bitstream format may allow for the definition of a substream group which comprises one, two or more of the plurality of substreams 411, 412, 413, 414. A substream group may be used to group different audio content such as atmospheric content, dialogs and/or effects. A presentation 401 may be indicative of a substream group. In other words, a presentation 401 may identify one, two or more substreams, which are to be rendered simultaneously, by referring to a substream group which comprises the one, two or more substreams. As such, substream groups provide an efficient means for identifying two or more substreams (which are possibly associated with one another).

The presentation section 510 may comprise one or more substream group entities (not shown in FIG. 5) for defining one or more corresponding substream groups. The substream group entities may be positioned subsequent to or downstream of the presentation data entities 512. A substream group entity may be indicative of one or more substreams 411, 412, 413, 414 which are comprised within the corresponding substream group. A presentation 401 (defined within a corresponding presentation data entity 512) may be indicative of the substream group entity, in order to include the corresponding substream group into the presentation 401. A decoder 7, 20 may parse through the presentation data entities 512 for identifying a particular presentation 401. If the presentation 401 makes reference to a substream group or to a substream group entity, the decoder 7, 20 may continue to parse through the presentation section 510 to identify the definition of the substream group comprised within a substream group entity of the presentation section 510. Hence, the decoder 7, 20 may determine the substreams 411, 412, 413, 414 for a particular presentation 401 by parsing through the presentation data entities 512 and through the substream group entities of the presentation section 510.

As such, the method 600 for generating a bitstream 500 may comprise inserting data for identifying the one, two or more of the plurality of substreams into a substream group entity of the presentation section 510. As a result of this, the substream group entity comprises data for defining the substream group.

The definition of a substream group may be beneficial in view of bit-rate reduction. In particular, a plurality of substreams 411, 412, 413, 414 which are used jointly within a plurality of presentations 401, 402, 403 may be grouped within a substream group. As a result of this, the plurality of substreams 411, 412, 413, 414 may be identified efficiently within the presentations 401, 402, 403 by referring to the substream group. Furthermore, the definition of a substream group may provide an efficient means for a content designer to master a combination of substreams 411, 412, 413, 414 and to define a substream group for the mastered combination of substreams 411, 412, 413, 414.

Hence, a bitstream 500 is described, which is indicative of an object based audio program and which allows for a resource efficient personalization. The bitstream 500 comprises a sequence of containers 501 for a corresponding sequence of audio program frames of the object based audio program, wherein a first container 501 of the sequence of containers 501 comprises a first audio program frame of the object based audio program. The first audio program frame comprises a first set of object channel frames of a set of object channels and a corresponding first set of object related metadata frames. The set of object channels may be indicative of audio content of at least some of a set of audio signals. Furthermore, the first container 501 comprises a plurality of substream entities 520 for a plurality of substreams 411, 412, 413, 414 of the object based audio program, wherein the plurality of substream entities 520 comprises a set of object channel substream entities 520 for the first set of object channel frames, respectively. The first container 501 further comprises a presentation section 510 with presentation data. The presentation data may be indicative of at least one presentation 401 of the object based audio program, wherein the at least one presentation 401 comprises a set of substream entities 520 from the plurality of substream entities 520 which are to be presented simultaneously.

The first audio program frame may further comprise a first speaker channel frame of a bed of speaker channels 421, wherein the bed of speaker channels 421 is indicative of audio content of one or more of the set of audio signals. The plurality of substream entities 520 of the bitstream 500 may then comprise a speaker channel substream entity 520 for the first speaker channel frame.

The bitstream 500 may be received by a decoder 7, 20. The decoder 7, 20 may be configured to execute a method for generating a personalized audio program from the bitstream 500. The method may comprise extracting presentation data from the presentation section 510. As indicated above, the presentation data may be indicative of a presentation 401 for the personalized audio program. Furthermore, the method may comprise extracting, based on the presentation data, one or more object channel frames and corresponding one or more object related metadata frames from the set of object channel substream entities 520 of the first container 501, in order to generate and/or render the personalized audio program. Depending on the content of the bitstream, the method may further comprise extracting, based on the presentation data, the first speaker channel frame from the speaker channel substream entity 520 of the first container 501.

The methods and bitstreams described in the present document are beneficial in view of the creation of personalized audio programs for a generic object based audio program. In particular, the described methods and bitstreams allow parts of a bitstream to be stripped off or extracted in a resource efficient manner. By way of example, if only parts of a bitstream need to be forwarded, this may be done without forwarding/processing the full set of metadata and/or the full set of audio data. Only the required parts of the bitstream need to be processed and forwarded. A decoder may only be required to parse the presentation section (e.g. the TOC data) of a bitstream in order to identify the content comprised within the bitstream. Furthermore, a bitstream may provide a "default" presentation (e.g. a "standard mix") which can be used by a decoder to start rendering of a program without further parsing. In addition, a decoder only needs to decode the parts of a bitstream which are required for rendering a particular personalized audio program. This is achieved by an appropriate clustering of audio data into substreams and substream entities. The audio program may comprise a possibly unlimited number of substreams and substream entities, thereby providing a bitstream format with a high degree of flexibility.

The methods and systems described in the present document may be implemented as software, firmware and/or hardware. Certain components may e.g. be implemented as software running on a digital signal processor or microprocessor. Other components may e.g. be implemented as hardware and or as application specific integrated circuits. The signals encountered in the described methods and systems may be stored on media such as random access memory or optical storage media. They may be transferred via networks, such as radio networks, satellite networks, wireless networks or wireline networks, e.g. the Internet.

Typical devices making use of the methods and systems described in the present document are portable electronic devices or other consumer equipment which are used to store and/or render audio signals.

Embodiments of the present invention may thus relate to one or more of the enumerated examples (EEs) listed below.

EEE 1. A method (600) for generating a bitstream (500) indicative of an object based audio program, wherein the bitstream (500) comprises a sequence of containers (501) for a corresponding sequence of audio program frames of the object based audio program; wherein a first container (501) of the sequence of containers (501) comprises a plurality of substream entities (520) for a plurality of substreams (411, 412, 413, 414) of the object based audio program; wherein the first container (501) further comprises a presentation section (510); wherein the method (600) comprises determining (601) a set of object channels (424) indicative of audio content of at least some of a set of audio signals; wherein the set of object channels (424) comprises a sequence of sets of object channel frames;

providing (602) a set of object related metadata (434, 444) for the set of object channels (424); wherein the set of object related metadata (434, 444) comprises a sequence of sets of object related metadata frames; wherein a first audio program frame of the object based audio program comprises a first set of object channel frames and a corresponding first set of object related metadata frames;

inserting (603) the first set of object channel frames and the first set of object related metadata frames into a respective set of object channel substream entities (520) of the plurality of substream entities (520) of the first container (501); and inserting (604) presentation data into the presentation section (510); wherein the presentation data is indicative of at least one presentation (401); wherein a presentation (401) comprises a set of substream entities (520) from the plurality of substream entities (520) which are to be presented simultaneously.

EEE 2. The method (600) of EEE 1, wherein a presentation (401) comprises one or more object channel substream entities (520) from the set of object channel substream entities.

EEE 3. The method (600) of any previous EEE, wherein the presentation data is indicative of a plurality of presentations (401, 402, 403) comprising different sets of substream entities (520); wherein the different sets of substream entities (520) comprise different combinations of the set of object channel substream entities (520).

EEE 4. The method (600) of any previous EEE, wherein the presentation data is segmented into different presentation data entities (512) for different presentations (401, 402, 403).

EEE 5. The method (600) of EEE 4, further comprising, inserting table of content data, referred to as TOC data, into the presentation section (510); wherein the TOC data is indicative of a position of the different presentation data entities (512) within the presentation section (510); and/or an identifier for the different presentations (401, 402, 403) comprised within the presentation section (510).

EEE 6. The method (600) of any previous EEE, wherein a substream entity (520) comprises a content sub-entity (521) for audio content (424) and a metadata sub-entity (522) for related metadata (434, 444).

EEE 7. The method (600) of any previous EEE, wherein a metadata frame for a corresponding channel frame comprises a plurality of different variants (434, 444) of metadata; and a presentation (401) is indicative of which variant (434) of metadata is to be used for rendering the corresponding channel frame.

EEE 8. The method (600) of any previous EEE, further comprising, determining a bed of speaker channels (421) indicative of audio content of one or more of the set of audio signals; wherein the bed of speaker channels (421) comprises a sequence of speaker channel frames; wherein the first audio program frame of the object based audio program comprises a first speaker channel frame of the bed of speaker channels (421); and inserting the first speaker channel frame into a speaker channel substream entity (520) of the plurality of substreams entities (520) of the first container (501).

EEE 9. The method (600) of EEE 8, wherein a presentation (401) also comprises the speaker channel substream entity (520).

EEE 10. The method (600) of any of EEEs 8 to 9, wherein the bed of speaker channels (421) comprises one or more speaker channels to be presented by one or more speakers (36), respectively, of a presentation environment.

EEE 11. The method (600) of any of EEEs 8 to 10, wherein the method (600) further comprises providing speaker related metadata (431, 441) for the bed of speaker channels (421);

the speaker related metadata (431, 441) comprises a sequence of speaker related metadata frames; and a first speaker related metadata frame from the sequence of speaker related metadata frames is inserted into the speaker channel substream entity (520).

EEE 12. The method (600) of any of EEEs 8 to 11, wherein the bed of speaker channels (421) comprises one or more of: 2.0 channels, 5.1 channels, and/or 7.1 channels.

EEE 13. The method (600) of any previous EEE, wherein the set of object channels (424) comprises a plurality of object channels (424).

EEE 14. The method (600) of any previous EEE, wherein an object channel (424) is to be presented by a combination of speakers (36) of a presentation environment.

EEE 15. The method (600) of EEE 14, wherein the object related metadata (434, 444) of an object channel (424) is indicative of a position within the presentation environment from which the object channel (424) is to be rendered.

EEE 16. The method (600) of any of EEEs 14 to 15, wherein the position of the object channel (424) is time-varying; a combination of speakers (36) for rendering the object channel (424) changes along the sequence of object channel frames of the object channel (424); and/or a panning of the speakers (36) of the combination of speakers (36) changes along the sequence of object channel frames of the object channel (424).

EEE 17. The method (600) of any previous EEE, wherein the bitstream (500) is an AC-4 bitstream.

EEE 18. The method (600) of any previous EEE, wherein the set of audio signals is indicative of captured audio content.

EEE 19. The method (600) of any previous EEE, wherein a presentation (401) comprises target device configuration data for a target device configuration; and the target device configuration data is indicative of a set of substream entities (520) from the plurality of substream entities (520) and/or of a variant (434) of metadata, which are to be used for rendering the presentation (401) on the target device configuration.

EEE 20. The method (600) of any previous EEE, wherein one, two or more of the plurality of substreams form a substream group; and a presentation (401) is indicative of the substream group.

EEE 21. The method (600) of EEE 20, further comprising inserting data for identifying the one, two or more of the plurality of substreams into a substream group entity of the presentation section (510); wherein the substream group entity comprises data for defining the substream group.

EEE 22. A bitstream (500) indicative of an object based audio program, wherein the bitstream (500) comprises a sequence of containers (501) for a corresponding sequence of audio program frames of the object based audio program;

a first container (501) of the sequence of containers (501) comprises a first audio program frame of the object based audio program;

the first audio program frame comprises a first set of object channel frames and a corresponding first set of object related metadata frames;

the first set of object channel frames is indicative of audio content of at least some of a set of audio signals;

the first container (501) comprises a plurality of substream entities (520) for a plurality of substreams (411, 412, 413, 414) of the object based audio program;

the plurality of substream entities (520) comprises a set of object channel substream entities (520) for the first set of object channel frames, respectively;

the first container (501) further comprises a presentation section (510) with presentation data;

the presentation data is indicative of at least one presentation (401) of the object based audio program; and a presentation (401) comprises a set of substream entities (520) from the plurality of substream entities (520) which are to be presented simultaneously.

EEE 23. The bitstream (500) of EEE 22, wherein the first audio program frame comprises a first speaker channel frame of a bed of speaker channels (421);

the bed of speaker channels (421) is indicative of audio content of one or more of the set of audio signals; and the plurality of substream entities (520) comprises a speaker channel substream entity (520) for the first speaker channel frame.

EEE 24. A method for generating a personalized audio program from a bitstream (500) comprising an object based audio program; wherein the bitstream (500) comprises a sequence of containers (501) for a corresponding sequence of audio program frames of the object based audio program;

a first container (501) of the sequence of containers (501) comprises a first audio program frame of the object based audio program;

the first audio program frame comprises a first set of object channel frames of a set of object channels (424) and a corresponding first set of object related metadata frames;

the set of object channels (424) is indicative of audio content of at least some of a set of audio signals;

the first container (501) comprises a plurality of substream entities (520) for a plurality of substreams (411, 412, 413, 414) of the object based audio program;

the plurality of substream entities (520) comprises a set of object channel substream entities (520) for the first set of object channel frames, respectively; and the first container (501) further comprises a presentation section (510);

wherein the method comprises extracting presentation data from the presentation section (510); wherein the presentation data is indicative of a presentation (401) for the personalized audio program; wherein the presentation (401) comprises a set of substream entities (520) from the plurality of substream entities (520) which are to be presented simultaneously; and based on the presentation data, extracting one or more object channel frames and corresponding one or more object related metadata frames from the set of object channel substream entities (520) of the first container (501).

EEE 25. The method of EEE 24, wherein
the first audio program frame comprises a first speaker channel frame of a bed of speaker channels (421);
the bed of speaker channels (421) is indicative of audio content of one or more of the set of audio signals;
the plurality of substream entities (520) comprises a speaker channel substream entity (520) for the first speaker channel frame; and
the method further comprises, based on the presentation data, extracting the first speaker channel frame from the speaker channel substream entity (520) of the first container (501).

EEE 26. A system (3) for generating a bitstream (500) indicative of an object based audio program, wherein the bitstream (500) comprises a sequence of containers (501) for a corresponding sequence of audio program frames of the object based audio program; wherein a first container (501) of the sequence of containers (501) comprises a plurality of substream entities (520) for a plurality of substreams (411, 412, 413, 414) of the object based audio program; wherein the first container (501) further comprises a presentation section (510); wherein the system (3) is configured to
determine a set of object channels (424) indicative of audio content of at least some of a set of audio signals; wherein the set of object channels (424) comprises a sequence of sets of object channel frames;
determine a set of object related metadata (434, 444) for the set of object channels (424); wherein the set of object related metadata (434, 444) comprises a sequence of sets of object related metadata frames;
wherein a first audio program frame of the object based audio program comprises a first set of object channel frames and a corresponding first set of object related metadata frames;
insert the first set of object channel frames and the first set of object related metadata frames into a respective set of object channel substream entities (520) of the plurality of substream entities (520) of the first container (501); and
insert presentation data into the presentation section (510); wherein the presentation data is indicative of at least one presentation (401); wherein a presentation (401) comprises a set of substream entities (520) from the plurality of substream entities (520) which are to be presented simultaneously.

EEE 27. A system (7) for generating a personalized audio program from a bitstream (500) comprising an object based audio program; wherein
the bitstream (500) comprises a sequence of containers (501) for a corresponding sequence of audio program frames of the object based audio program;
a first container (501) of the sequence of containers (501) comprises a first audio program frame of the object based audio program;
the first audio program frame comprises a first set of object channel frames of a set of object channels (424) and a corresponding first set of object related metadata frames;

the set of object channels (424) is indicative of audio content of at least some of a set of audio signals;
the first container (501) comprises a plurality of substream entities (520) for a plurality of substreams (411, 412, 413, 414) of the object based audio program;
the plurality of substream entities (520) comprises a set of object channel substream entities (520) for the first set of object channel frames, respectively; and
the first container (501) further comprises a presentation section (510);
wherein the system (7) is configured to
extract presentation data from the presentation section (510); wherein the presentation data is indicative of a presentation (401) for the personalized audio program; wherein the presentation (401) comprises a set of substream entities (520) from the plurality of substream entities (520) which are to be presented simultaneously; and
based on the presentation data, extract one or more object channel frames and corresponding one or more object related metadata frames from the set of object channel substream entities (520) of the first container (501).

The invention claimed is:

1. A method for rendering an audio program from an encoded bitstream, the method comprising:
extracting presentation data from the encoded bitstream, wherein the presentation data is indicative of a presentation of the audio program, and wherein the presentation data corresponds to a set of substream entities; and
rendering, based on the presentation data, a first set of object channel frames and metadata corresponding to the set of substream entities,
wherein the audio program comprises a plurality of substreams that includes the set of substream entities, and wherein the audio program comprises a first audio program frame,
wherein the first audio program frame is part of a set of object channels and a corresponding first set of object related metadata frames; wherein an object channel frame is to be presented by a combination of speakers of a presentation environment, wherein an object related metadata frame of an object channel frame is indicative of a position within the presentation environment from which the object channel frame is to be rendered; and wherein the set of object channels is indicative of audio content of at least some of a set of audio signals.

2. The method of claim 1, wherein the first audio program frame comprises a first speaker channel frame of a bed of speaker channels; wherein the bed of speaker channels is indicative of audio content of one or more of the set of audio signals; wherein the plurality of substream entities comprises a speaker channel substream entity for the first speaker channel frame; and wherein the method further comprises, based on the presentation data, extracting the first speaker channel frame from the speaker channel substream entity of the first container.

3. A system for rendering an audio program from an encoded bitstream, the system comprising:
a processor for extracting presentation data from the encoded bitstream, wherein the presentation data is indicative of a presentation of the audio program, and wherein the presentation data corresponds to a set of substream entities; and a renderer for rendering, based on the presentation data, a first set of object channel frames and metadata corresponding to the set of substream entities, wherein the audio program comprises a plurality of substreams that includes the set of substream entities, and wherein the audio program comprises a first audio program frame, wherein the first audio program frame is part of a set of object channels and a corresponding first set of object related metadata frames; wherein an object channel frame is to be presented by a combination of speakers of a presentation environment, wherein an object related metadata frame of an object channel frame is indicative of a position within the presentation environment from which the object channel frame is to be rendered; and wherein the set of object channels is indicative of audio content of at least some of a set of audio signals.

4. A non-transitory storage medium having a bitstream configured to render according to the method of claim 1.

* * * * *